(No Model.)　　　　　　　　　　　　　　　　6 Sheets—Sheet 2.
J. A. GROSHON.
DIRECT ACTING STEAM ENGINE.
No. 499,730.　　　　　　　　　Patented June 20, 1893.

WITNESSES
Geo. Dieterich
R. A. Porteous

INVENTOR
John A. Groshon,
BY Chas. C. Gill ATTORNEY.

(No Model.) 6 Sheets—Sheet 3.
J. A. GROSHON.
DIRECT ACTING STEAM ENGINE.
No. 499,730. Patented June 20, 1893.
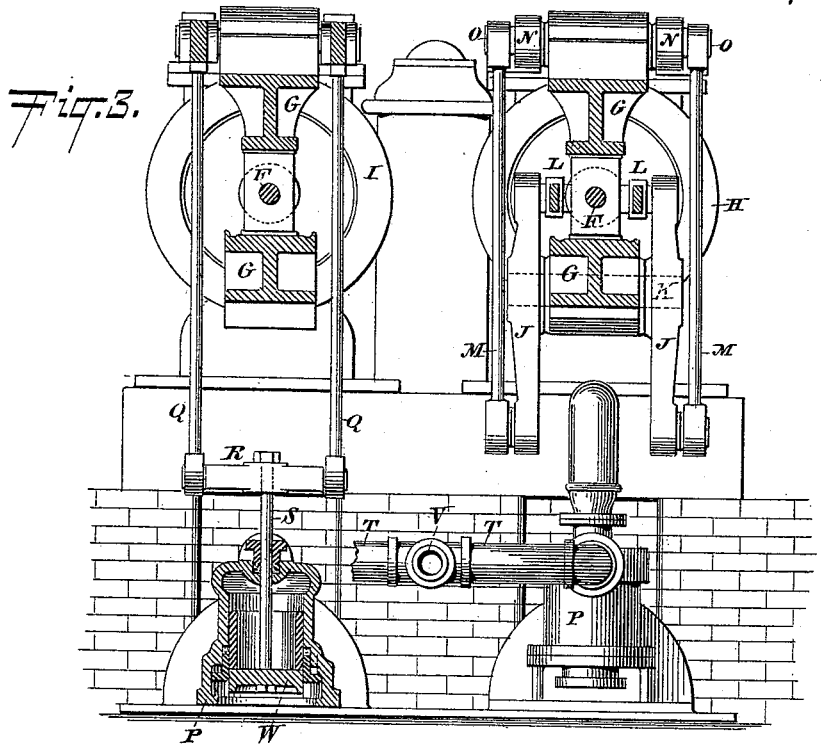
Fig. 3.
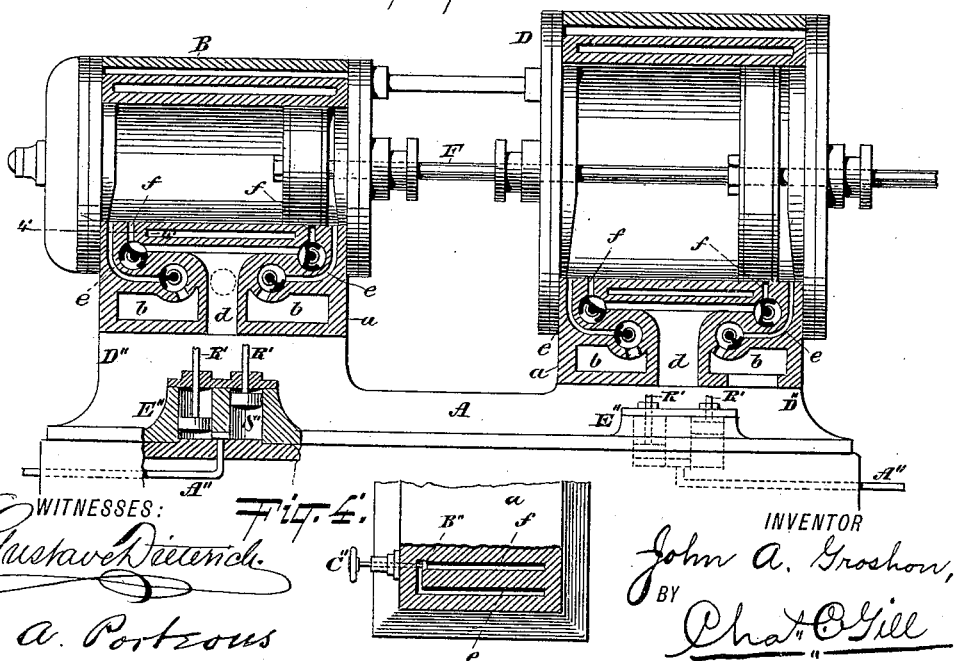
Fig. 4.
Fig. 4'.
WITNESSES:
Gustave Dieterich
R. A. Portzous
INVENTOR
John A. Groshon,
BY Chas. O. Gill
ATTORNEY.

(No Model.)
6 Sheets—Sheet 4.
J. A. GROSHON.
DIRECT ACTING STEAM ENGINE.
No. 499,730. Patented June 20, 1893.
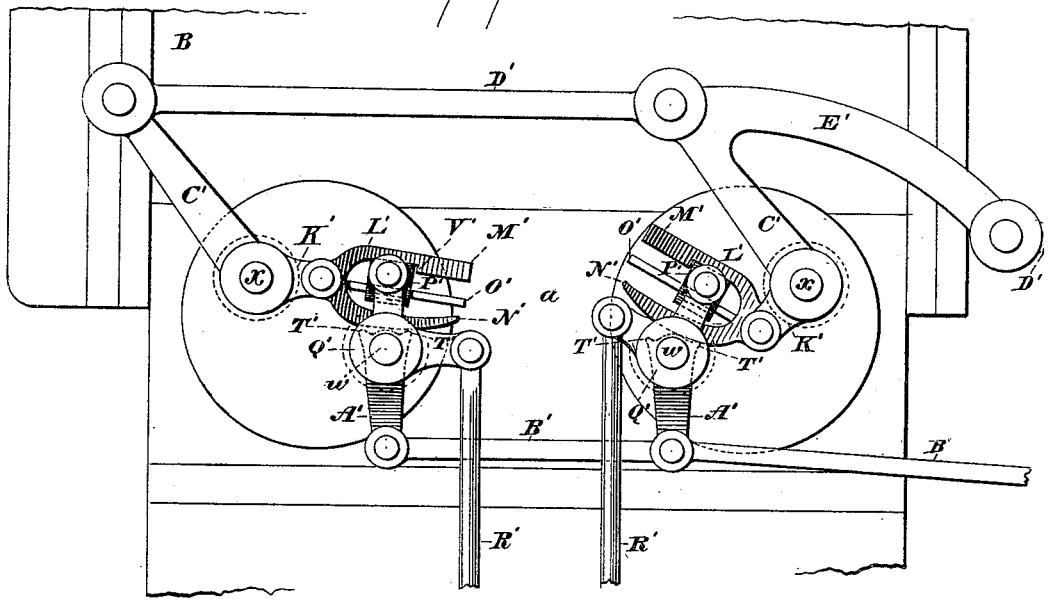
Fig. 5.
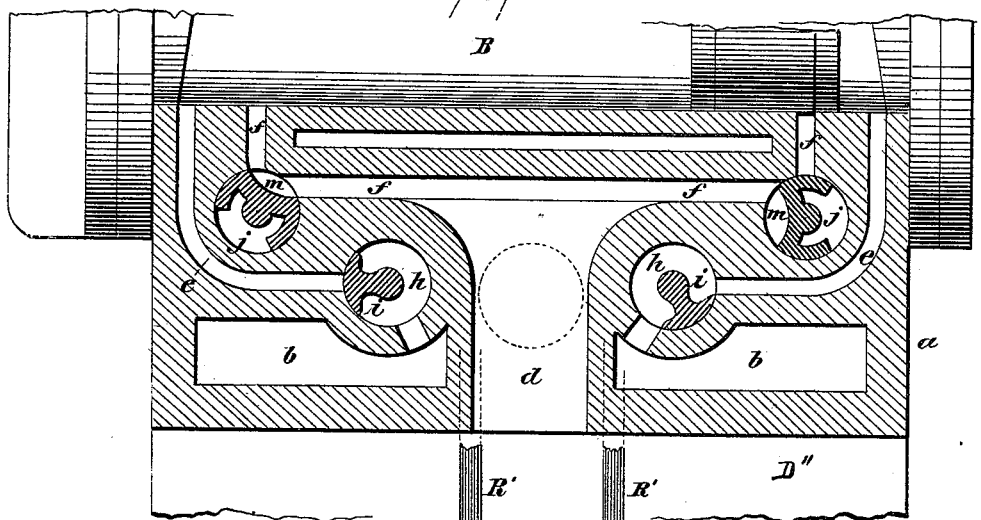
Fig. 6.
WITNESSES:
Gustave Dietench.
R. A. Portrous
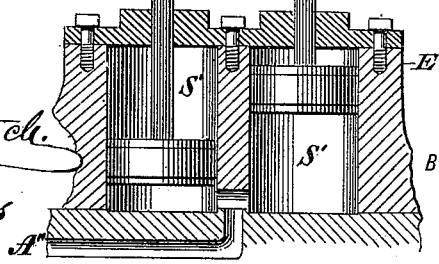
INVENTOR
John A. Groshon,
BY Chas. O. Gill
ATTORNEY.

(No Model.) 6 Sheets—Sheet 5.
J. A. GROSHON.
DIRECT ACTING STEAM ENGINE.

No. 499,730. Patented June 20, 1893.

WITNESSES:
Gustave Dieterich
R. A. Porteous

INVENTOR
John A. Groshon
BY
Chas. O. Gill
ATTORNEY.

(No Model.) 6 Sheets—Sheet 6.
J. A. GROSHON.
DIRECT ACTING STEAM ENGINE.
No. 499,730. Patented June 20, 1893.
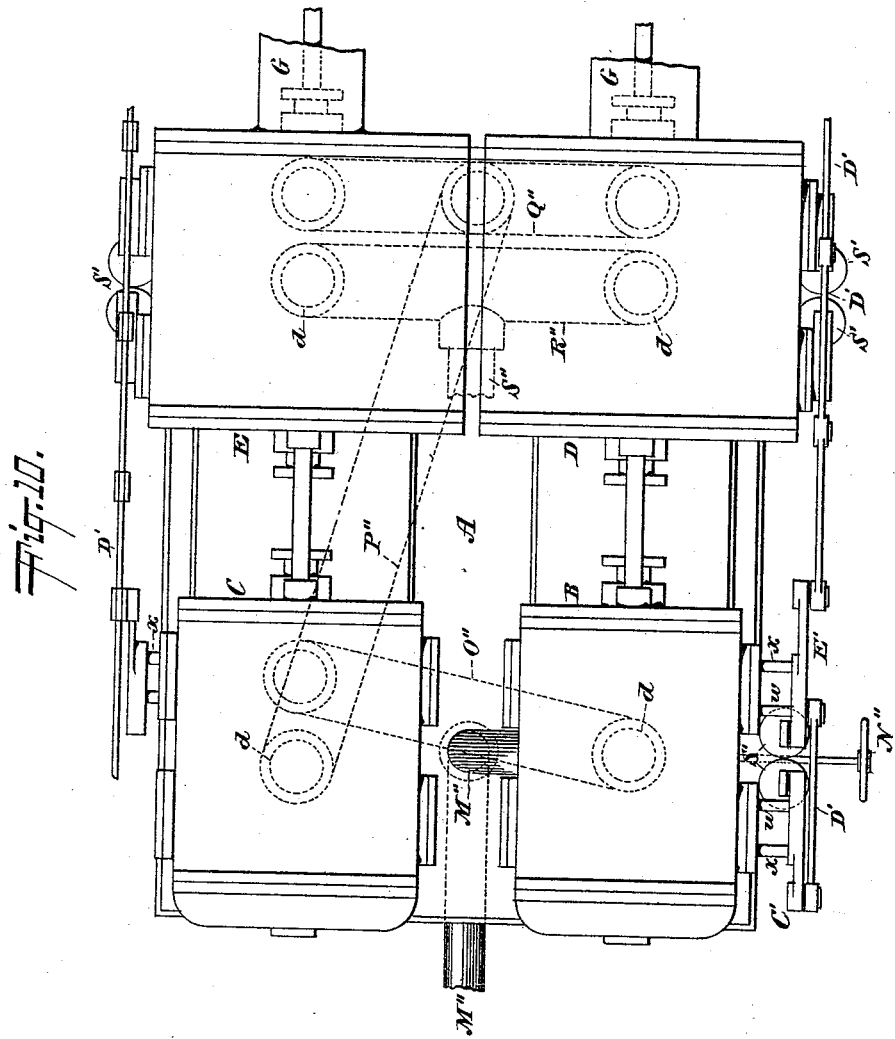
WITNESSES:
Gustave Dieterich
Ed. D. Miller.
INVENTOR:
John A. Groshon,
BY Chas. O. Gill
ATTORNEY

UNITED STATES PATENT OFFICE.

JOHN A. GROSHON, OF NEW YORK, N. Y.

DIRECT-ACTING STEAM-ENGINE.

SPECIFICATION forming part of Letters Patent No. 499,730, dated June 20, 1893.

Application filed February 17, 1892. Serial No. 421,824. (No model.)

*To all whom it may concern:*

Be it known that I, JOHN A. GROSHON, a citizen of the United States, and a resident of New York, in the county of New York and State of New York, have invented certain new and useful Improvements in Direct-Acting Steam-Engines, of which the following is a specification.

The invention relates to improvements in direct acting steam pumping engines, and particularly to that class thereof known as high duty engines in which the steam is used expansively and which employ compensating apparatus for opposing the main piston rods during the first portion of their stroke and aid the same during the latter part of their stroke.

The invention embraces the features hereinafter described and particularly pointed out in the claims, and pertains specially to the arrangement of the high pressure, intermediate and two low pressure cylinders by which a triple expansion duplex direct acting steam engine of great economy is produced; to the induction and exhaust ports with their oscillating valves; to the connections whereby the valve gear is driven directly from the compensating apparatus, each side of the engine releasing its own induction valves and driving the induction and exhaust valves of the other side of the engine; to an automatic regulator for the cut off or release mechanism suited to the variations of the steam pressure and the load; to the means for maintaining the vacuum in the dash pots connected with the valve gear; and to structural features, all as hereinafter fully described with reference to the accompanying drawings, in which—

Figure 1:
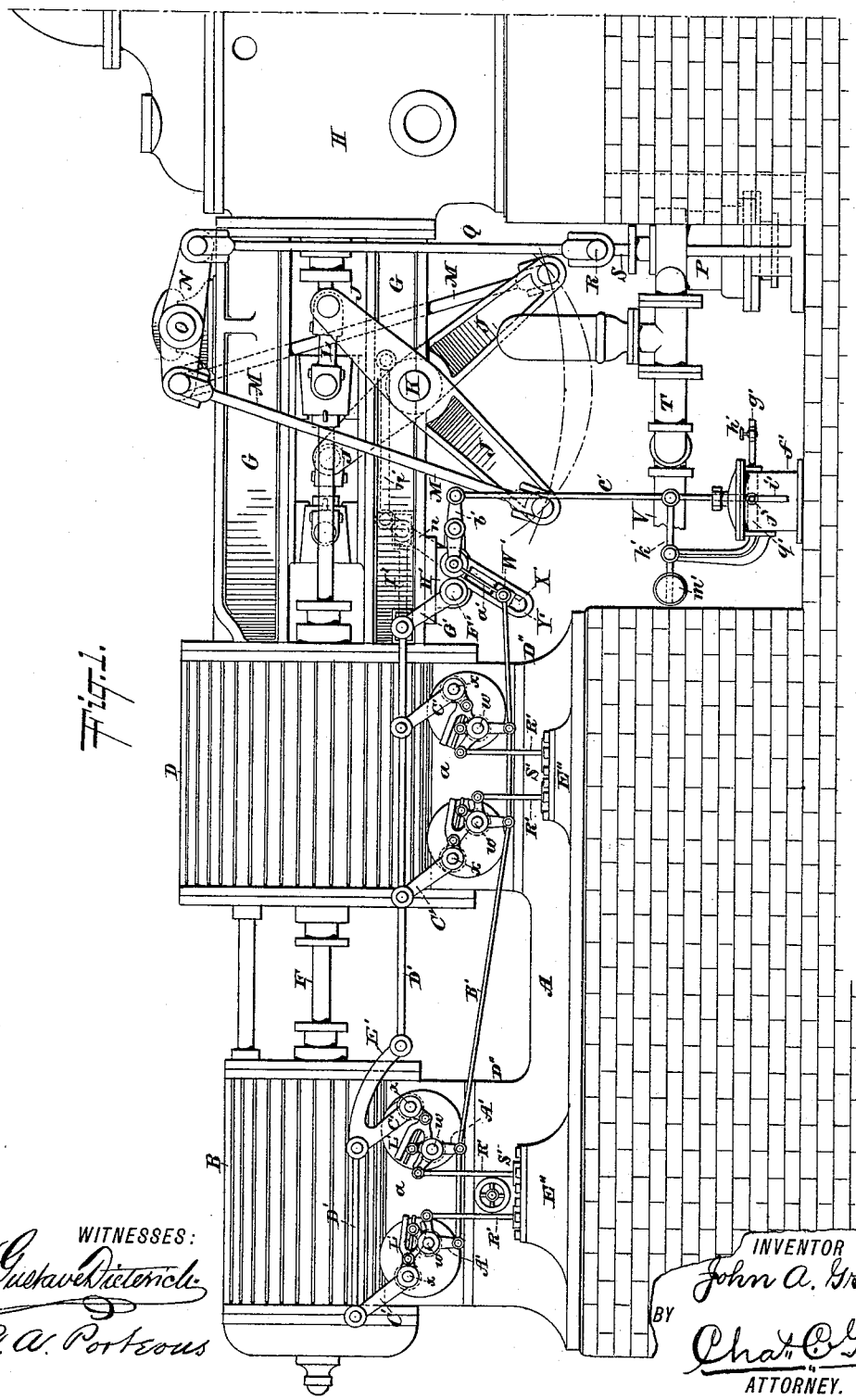
Figure 2:
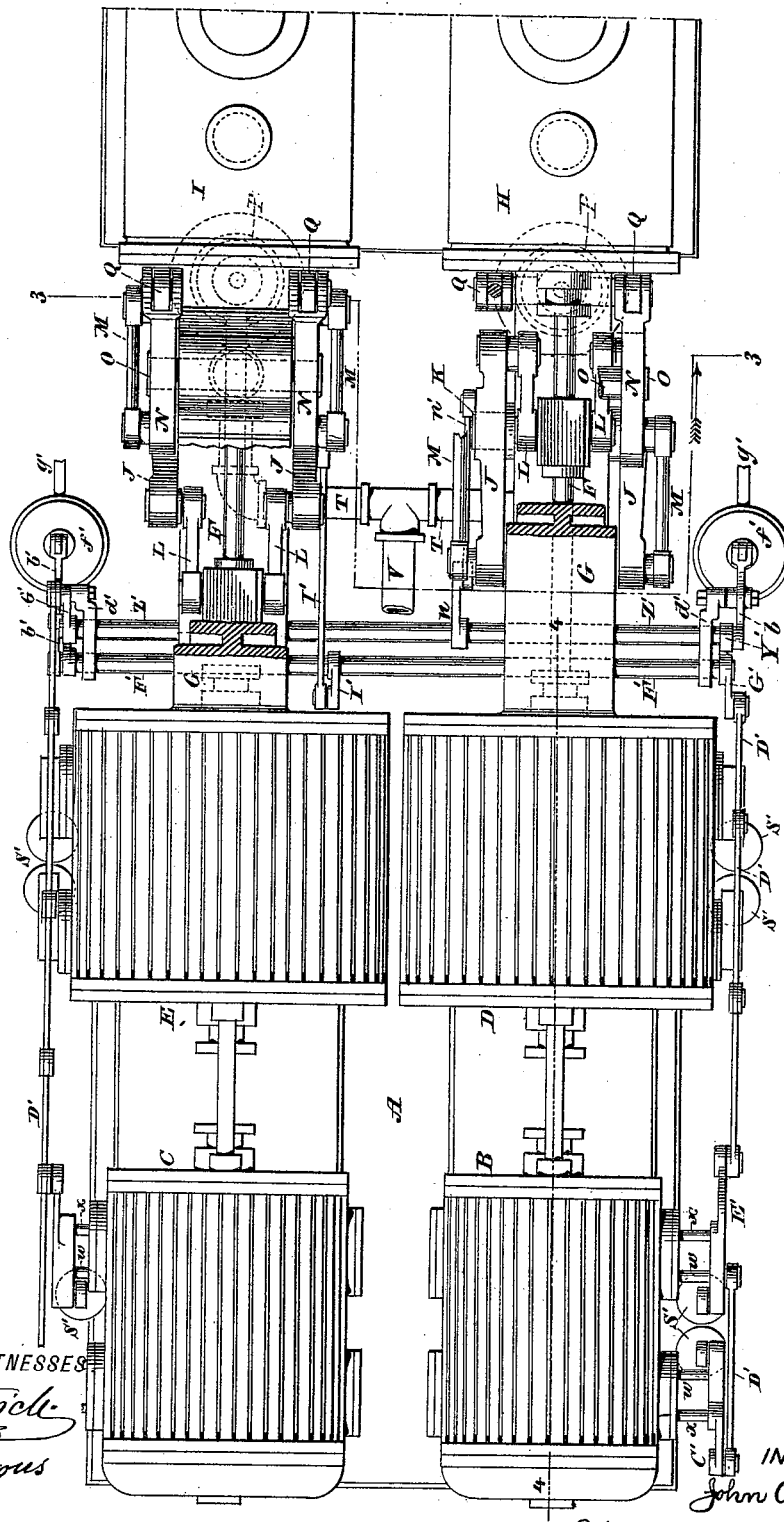
Figure 7:
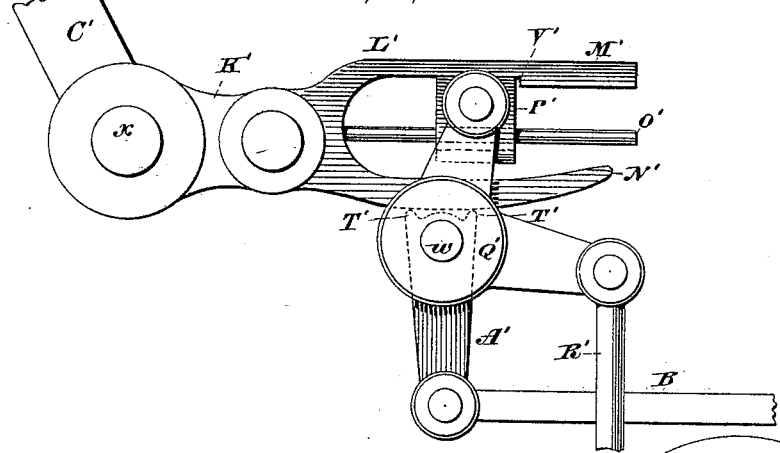
Figure 2:
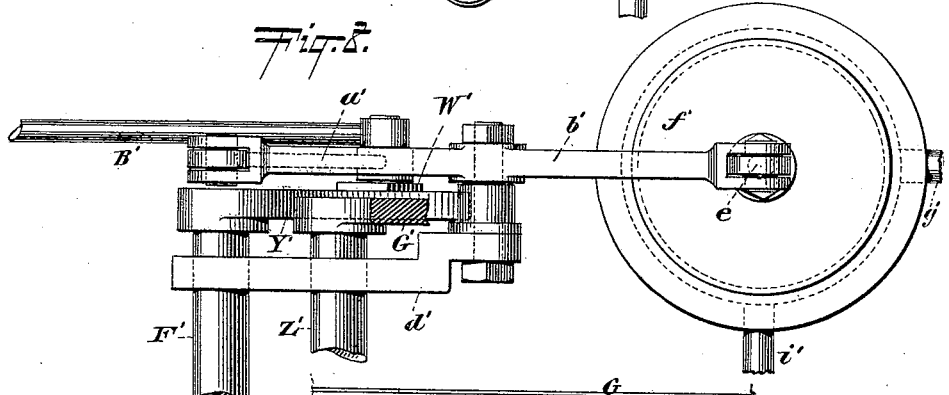
Figure 8:
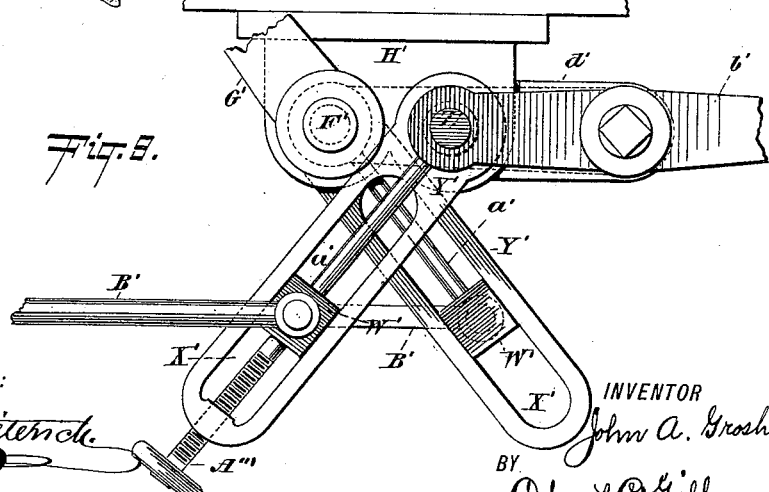

Figure 1 is a side elevation of a triple expansion duplex direct acting steam engine, constructed in accordance with the invention. Fig. 2 is a top plan view of same, partly broken away. Fig. 3 is a vertical section of same on the dotted line 3—3 of Fig. 2. Fig. 4 is a central vertical longitudinal section of same on the dotted line 4—4 of Fig. 2. Fig. 4' is a detached top view, partly in section, of one end of one of the valve chests for the steam cylinders and illustrating the connection between the induction and exhaust ports with the valve for regulating the same. Fig. 5 is an enlarged detached plan view of the mechanism employed for setting and releasing the valves. Fig. 6 is an enlarged vertical section through the valves and dash pots, said section being the same as that of the high pressure cylinder shown in Fig. 4 only on an enlarged scale. Fig. 7 is a detached enlarged front elevation of a well known form of Corliss valve gear employed on each of the steam cylinders. Fig. 8 is an enlarged detached top view, partly broken away, of a part of the lever mechanism for driving the rods connected with the valve gear at the left hand side of the engine, and of means for regulating the point of cut off or release. Fig. 9 is an enlarged detached side elevation of a part of the lever mechanism at the opposite sides of the engine connected with the rods which drive the induction valves of the steam cylinders and Fig. 10 is a top view of the cylinders of the engine with the steam connections between said cylinders and below the base thereof, shown by dotted lines.

In the drawings A designates the base of the engine; and upon said base are mounted the cylinders lettered B, C, D, E, respectively, the cylinder B being the high pressure cylinder, that lettered C the intermediate cylinder, and those lettered D, E, the low pressure cylinders, the cylinders B, D, with their connections forming the right side of the engine, and the cylinders C, E, with their connections forming the left hand side of the engine; and each side of the engine is provided with a piston rod F carrying the usual pistons within the cylinders and extending through the cylinders and between the guide beams G, G, to the pumping end of the engine. The guide beams G, G, are arranged in pairs, one above the other, for each side of the engine and connect the low pressure cylinders D, E, with the pumps lettered H, I, respectively, which are of the usual construction, being provided with the customary plungers connected directly with the piston rods F.

The piston rods F are provided with compensating apparatus which oppose their movement during the first part of their stroke and act in conjunction therewith during the latter part of their stroke. This compensating apparatus connected with the piston rods F is duplicated for each side of the engine, and for each piston rod F, consists of the rocking levers J mounted upon the transverse shaft K and connected at their upper ends by links L with the piston rod F, and at their lower ends being connected with the rods M extending upward upon the opposite sides of the guide beams G to the short arms of the auxiliary rocking levers N mounted upon the shaft O and being in connection at the end of their longer arms with the pressure cylinder P through the medium of the downwardly extending rods Q and the cross head R united with the piston rod S of said pressure cylinder and connecting the lower ends of said rods Q. The pressure cylinders P for the opposite sides of the engine are connected with each other and with the water main by the pipes T, V, the pressure of the water being upon the upper side of the pistons W in said cylinders.

The compensating apparatus above described is shown in Letters Patent of the United States No. 444,828, issued to me January 20, 1891, for improvements in direct acting steam engines, with the exception of the cross head R connecting the lower ends of the rods Q and piston rod of the pressure cylinder P, and the pipe connections T, V, by which a uniform pressure is maintained in the cylinders P. The connection of the rods Q and piston rod S by the cross-head R furnishes a durable and compact structure in which but one pressure cylinder P for each side of the engine is necessary.

At the lower side of each of the cylinders B, C, D, E, is provided a valve chest a, shown more clearly in Figs. 4 and 6, the chests being duplicates of each other, and each having the induction chamber b which extends throughout the lower portion of said chest, with the exception of the space at the vertical center thereof occupied by the exhaust d. The chambers b for the cylinders B, C, D, E, form receivers which during the operation of the engine are kept full of steam ready to enter the cylinders as the induction valves change to permit that result. The connections between the chambers b for the different cylinders are shown in Fig. 10, in which the main-supply pipe for steam is lettered M″ and leads into the side of the chamber b for the cylinder B, and said pipe M″ will have a suitable valve N″. From the exhaust d of the cylinder B a pipe O″ leads into the lower surface of the chamber b for the cylinder C; and from the exhaust d of the cylinder C a pipe P″ leads to the pipe Q″ which connects at its ends with the chambers b of both cylinders D, E; while the exhaust d of both cylinders D, E, is connected by the pipe R″ having a pipe S″ leading to a point of final exhaust or discharge. The steam entering the chamber b of the cylinder B passes through ports and valves hereinafter described into said cylinder B and exhausts therefrom through the pipe O″ into the chamber b of the cylinder C, passing thence into said cylinder C, from which it exhausts through the pipes P″, Q″ into the chambers b of both of the cylinders D, E, from which cylinders it will finally exhaust through the pipes R″, S″. The entrance of the steam from the chambers b to the ends of the cylinders and its exhaust from the ends of said cylinders will be controlled by the position of the induction and exhaust valves hereinafter described.

The valve chests a are each provided at opposite ends with the induction and exhaust ports lettered e, f, respectively, the ports e leading from the chambers b to the ends of the cylinder and the ports f leading from the cylinder adjacent to its ends into the exhaust d, which will connect with the condenser or be open to the atmosphere.

Within the line of the induction ports e are the cavities h containing the oscillating valves i, and within the line of the exhaust ports f are the cavities j containing the oscillating valves m. The induction and exhaust valves i, m, are so placed in the cavities h, j, that when the induction port e at one end of the cylinder is closed the adjoining exhaust port f will be open, and when the said induction port e is open the adjoining exhaust port f will be closed. The arrangement of the valves i, m, is such, also, that when the induction port e at one end of the cylinder is open and its adjacent exhaust port f is closed, the induction port e at the opposite end of the cylinder is closed and its adjoining exhaust port f open. The relation of the cavities j with the exhaust ports f, is such that the main body of the cavities is removed from the line of the ports, and this in conjunction with the E-form of the valves m prevents the steam from passing behind the valves into the larger part of the cavities j and keeps it in the direct line of the exhaust ports f. The exhaust valves m are, as shown, of E-form, with their upper and lower ends constituting the working faces pointing outward toward the ends of the cylinder, thus enabling them to properly close the exhaust ports when desired and to cut off the steam from passing into the main body of the cavities j when the said ports are open. Thus that portion of the cavities back of the valves m is never exposed to steam pressure.

The induction and exhaust valves i, m, for each side of the engine, have the outwardly extending transverse stems w, x, the former, or induction valve stems, being connected at each side of the engine through the lever arms A′ with the pull rods B′ of the automatic release mechanism presently to be described, while the stems x of the exhaust valves m for each side of the engine are through the lever arms C′ connected with the pull rods D′ which are connected with each other by the arms E′ and with the ends of the rock-shafts F′, Z′, by the arms G′. The pull rods D′ at the right hand side of the engine are through the arm G′ connected with the end of the rock shaft F′, as shown in Figs. 1 and 2; and the similar rods D′ at the left hand side of the engine are connected by their arm G' with the end of the rock shaft Z', as shown in Fig. 2; thus it will be noted that the rods D' at the right hand side of the engine will be driven from the rock-shaft F', and that the similar rods D' at the left hand side of the engine will be driven from the rock-shaft Z'.

As will hereinafter appear the rock-shaft F' although driving the valve rods D' at the right hand side of the engine, is itself actuated from the compensating apparatus for the left hand side of the engine; and the rock-shaft Z', although driving the valve rods D' at the left hand side of the engine, is itself actuated from the compensating apparatus for the right hand side of the engine. The rock-shaft F' is mounted in bearings H' secured to the lower side of the lower guide beams G, and said shaft F' extends transversely from one side of the engine to the other, as shown in Fig. 2. The rock-shaft F' is connected by means of the jointed levers I' with the rocking lever J of the compensating apparatus for the left hand side of the engine, and said shaft is actuated and the pull rods D' for the right hand side of the engine operated by said compensating apparatus. The rock-shaft Z' is parallel with the rock-shaft F', and is connected by the jointed arms n' with and is driven by the rocking lever J of the compensating apparatus for the right hand side of the engine, although said shaft Z' operates the valve pull rods D' at the left hand side of the engine.

Upon the outer ends of the exhaust valve stems x at each side of the engine are mounted the short arms K' to which are pivotally secured the bifurcated levers L' between whose open arms M', N', are mounted on guide rods O' the sliding blocks P' pivotally secured to the upper arms of the bell crank levers Q' which are mounted on the induction valve stems w and have their other or lower arms connected with the piston rods R' of the dash pots S'. The lower curved arms N' of the bifurcated levers L' bear upon the upper or hub end of the lever arms A' whereon are the cam projections T', which as the said lever arms A' are actuated by the rod B' effect the elevation and permit the depression of said bifurcated levers L', with the result that the blocks P' may be released from or caught by the shoulder V' on the lower side of the upper arms of the levers L'. When the lever L' is in its upward position and the block P' is caught by the shoulder V', as shown at the right hand side of Fig. 5, the valve i will be free of and not cover the port e, as shown at the right hand side of Fig. 6, but when the block P' is released from the shoulder V' the piston in the dash pot S' below it, drawing downward through its rod R' will lift or turn the valve i upward to cover the port e, as indicated at the left hand side of Fig. 6.

The bifurcated levers L' bearing on the cam projections T' of the lever arms A' and the bell crank levers Q' carrying the blocks P' and connected with the piston rods of dash pots constitute a familiar form of the well known "Corliss" valve gear and hence it is not independently claimed herein, nor is a more minute description thereof deemed necessary. The means presented for driving said gear form a part of the invention however, and from the foregoing description it will be understood that this gear for the right hand side of the engine is operated through the rods D', lever arm G', rock shaft F' and jointed levers I' from the rocking lever J of the compensating apparatus for the left hand side of the engine, and that the gear for the left hand side of the engine is operated through the rods D', lever arm G', rock shaft Z', and jointed lever arms n' from the rocking lever J of the compensating apparatus for the right hand side of the engine; while the release mechanism at each side of the engine is operated through the aforesaid pull rods B', whose outer ends carry the sliding block W' held in the elongated slots X' of the levers Y', which, as shown in Figs. 1, 8 and 9, are secured on the ends of the above mentioned rock-shafts F', Z', the lever Y' for the release mechanism at the right hand side of the engine being secured on the right hand end of the rock shaft Z', while the similar lever Y' for the release mechanism at the left hand side of the engine is secured on the left hand end of the rock-shaft F'; thus each side of the engine releases its own induction valves, and, as described above, drives the induction and exhaust valves of the other side of the engine. The block W' at each side of the engine is connected with the lower end of the pull rod a' (see Fig. 1) which rod at its upper end connects with the rocking lever b' pivotally mounted on the bracket d', see more clearly in Fig. 2, which bracket loosely straddles the ends of the rock-shafts F', Z', but has no movement with or upon said shafts, the latter simply freely passing through apertures in and supporting said bracket. The outer end of the rocking lever b' at each side of the engine, is directly connected with the upper end of the piston rod e' which extends downward and carries a piston q' within the rigid cylinder f' having the inlet pipe g' controlled by a valve h', and an outlet or overflow pipe i' having a controlling valve j'. The piston rod e' is connected by a pivoted arm k' with the weight m' which serves to counterbalance the weight of the rod above its piston.

The slotted levers Y' on the rock-shafts F', Z', are for regulating the point at which during the movement of the main pistons the steam shall be cut off and by connecting the blocks W' carried by said levers with the piston rods e' I am enabled to render the cutting off of the steam entirely automatic and variable with the action of the pumps and in accomplishing the latter function each of the supply pipes g' will be connected with both ends of the water cylinder so that the water at each thrust of the plunger will be driven into said pipes $g'$ and exert a downward pressure upon the upper surface of the pistons $q'$ in the cylinders $f'$.

In the use of the cylinders $f'$ for the purpose of automatically cutting off the steam under the action of the water in the pumping cylinders the valves in the inlet and outlet pipes $g'$, $i'$, should be adjusted to let the water pass through the cylinders $f'$ and at the same time permit that accumulation of pressure on the pistons $q'$ which will be sufficient to draw the piston rods $e'$ downward and elevate the blocks $W'$ connected with the ends of the rods $B'$, thereby moving the induction valves to cut off the steam at a predetermined point in the movement of the main steam pistons.

The invention is not confined to the use of the lever arms $Y'$ carrying the sliding blocks $W'$ connected with the levers $b'$ and piston rods $e'$, but when said parts are thus connected and used in conjunction a very sensitive automatic cut off mechanism is produced. In many instances it will simply be necessary to make use of the slotted lever arms $Y'$ mounted on the rock-shafts $F'$, $Z'$, and provided with means (such as the screw $A'''$ shown in Fig. 9) for adjusting the blocks $W'$ in the slots $X'$ with reference to the point of cut off. In the absence of the cylinders $f'$ and piston rods $e'$, the point of cut off will be regulated by the throw of the lever arms $Y'$ and the position of the blocks $W'$ therein; and should it be desired to have the lever arms $Y'$ stationary the cut off or release would be effected simply by the piston rods $e'$ acting through intermediate mechanism on the rods $B'$. When, however, the oscillating levers $Y'$ are employed in conjunction with the piston rods $e'$ and intermediate mechanism between said rods and the rods $B'$ the release or cut off may be rendered thoroughly automatic, sensitive, reliable, and variable with the steam pressure and the load. The pipes $g'$ to the cylinders $f'$ will preferably each be connected, as above described, with both ends of the water cylinder in order that the pressure of the water may automatically regulate the release or cut off, but I do not limit the invention to the connecting of the release regulating mechanism with the pump cylinders, since said inlet pipes $g'$ may be connected if desired with some other source of fluid under pressure which will act upon the upper surface of the pistons $q'$ in the cylinders $f'$.

The dash pots $S'$ are of the usual construction with the exception that they are provided with the pipe $A''$ connected with the usual condenser, not shown, and this new feature is one of great importance since thereby a vacuum is constantly preserved below the pistons in said dash pots until the pistons pass low enough to close the port between the two cylinders when the cushioning effect takes place by the compression of the air beneath the pistons.

In Fig. 4' is shown the passage $B''$ connecting the induction and exhaust ports and provided with the valve $C''$ by which said passage may be more or less opened. The induction and exhaust ports at each end of each valve chest $a$ will be provided with the passage $B''$ and valve $C''$ to regulate the extent of the cushion formed by the steam trapped at the ends of the cylinder on the covering of the exhaust ports by the main pistons.

The formation of the base A of the engine is novel, and said base has below each of the cylinders B, C, D, E, the elevated portions or auxiliary bases $D''$ extending the full length of the cylinders and supporting the valve chests $a$. At the outer side of the cylinders B, C, D, E, the base A is provided with the elevated portions $E''$ in which are formed the dash pots $S'$; and the base constructed as shown and described is durable and of neat appearance, and permits the placing of the cylinders and arranging of the valve gear in a convenient manner for their ready inspection, adjustment or detachment.

In considering the operation of the engine, it is to be understood that the chambers $b$ are filled with steam, and that the position of the main pistons and induction and exhaust valves for the cylinders B, D, or one side of the engine, will be just the opposite of the position of the main pistons and induction and exhaust valves for the cylinders C, E, constituting the other side of the engine. The induction and exhaust valves at one end of each cylinder are also in a position opposite to that of the induction and exhaust valves at the opposite end of the cylinder, as shown in Fig. 4. In view of the conditions just stated it is obvious the entrance of steam to and its exhaust from the ends of the cylinders B, C, D, E, will be controlled by the changing positions of the induction and exhaust valves under the action of the Corliss valve gear driven from the rock shafts $F'$, $Z'$, through the rods $D'$, $B'$. The relative positions of the induction and exhaust valves at the opposite ends of the cylinders have been described above and are illustrated in Fig. 6. The release mechanism for cutting off the steam at a definite point in the stroke of the pistons has also been described above and is more clearly shown in Figs. 1, 2, 8 and 9, the latter figure illustrating the slotted lever $Y'$ secured on the right hand end of the rock shaft $Z'$ and the similar lever $Y'$ on the left hand end of the rock shaft F.

The arrangement of the cylinders B, C, D, E, in the manner shown and described is of great importance in that thereby a triple expansion effect is secured, and too great a range of temperature between the initial and terminal pressures of steam in the cylinder is avoided. By the arrangement of the cylinders shown sudden or abrupt falls of the pressure on the passage of the steam from one cylinder to another is avoided, and great economy and high duty in the engine are secured.

During the reciprocating movement of the piston rods F they are opposed during the first part of their stroke and aided during the latter part of their stroke by the compensating apparatus described above and whose operation is well understood, the same having been fully disclosed in the aforesaid Letters Patent No. 444,828, granted to me January 20, 1891. While the use of the compensating apparatus shown and described is recommended on account of its efficiency, it is not intended to limit the invention to its use in every instance since there are other known forms of compensating apparatus which may be substituted for it. Neither is it intended to confine the invention to an engine employing the four cylinders described, although great efficiency may be obtained by the use of such engine.

What I claim as my invention, and desire to secure by Letters Patent, is—

1. In a direct acting steam engine the high, intermediate and low pressure cylinders, arranged in the relation described, and each provided at each end with the induction and exhaust ports and valves, connecting mechanism whereby each side of the engine drives the induction and exhaust valves of the other side of the engine, and automatic mechanism for releasing the induction valves, combined with the pistons and rods, gear for operating the valves and mechanism connected with the piston rods for opposing them during the first part of their stroke and aiding them during the latter part of their stroke; substantially as set forth.

2. In a direct-acting steam engine, the steam cylinder with its piston and rod, combined with the valve chest extending the length of said cylinder and forming the central main exhaust chamber $d$ and the surrounding main supply chamber $b$ connected with a source of steam supply, the induction ports $e$ at each end of said chest and leading from the chamber $b$ to the cylinder, the chamber $h$ intermediate the ends of said ports the oscillating valves $i$ in said chambers, the independent eduction ports $f$ at each end of said chest and extending from the cylinder into said central main exhaust chamber $d$, the valve chambers intercepting said ports $f$, and the oscillating valves in said valve chambers, substantially as set forth.

3. In a direct acting steam engine, the steam cylinders, with their pistons, rods, and induction and exhaust ports, combined with the oscillating induction and exhaust valves for said ports, the gear for driving and releasing said valves, the cylinders S' having their piston rods R' connected through crank arms with said valves to assist them to cover their ports, and connections between the cylinders S' and the condenser; substantially as set forth.

4. In a direct acting steam pumping engine employing steam expansively, the water cylinders, the steam cylinders with their induction and exhaust valves, and valve gear for driving said valves and effecting the release or cut off, combined with the cylinder $f'$ connected through its piston and rod with the release mechanism and closed at its upper end, the valve controlled pipe leading the water to the upper side of said piston, and the valve controlled pipe leading from the upper side of said piston; substantially as and for the purposes set forth.

5. In a direct acting pumping engine, the water cylinders, the steam cylinders with their induction and exhaust valves, and valve gear for driving said valves and effecting the release or cut off, combined with the cylinder $f'$ closed at its upper end and connected through its piston and rod with the release mechanism, an inlet pipe leading from both ends of the water cylinder to the cylinder $f'$ above its piston, an outlet from said cylinder above its piston, and means for regulating the quantity of water passing through said cylinder, substantially as set forth.

6. In a direct acting steam engine in which the steam is used expansively the cylinders with their pistons and piston rods, the valve chests, the induction and exhaust ports therein, the induction and exhaust valves and valve gear for driving said valves, combined with compensating apparatus connected with the main piston rods at each side of the engine, and mechanism intermediate said compensating apparatus and said valve gear for imparting movement from the former to the latter; substantially as set forth.

7. In a direct acting steam engine in which the steam is used expansively, the compensating apparatus connected with the main piston rods at each side of the engine, and intermediate mechanism between said apparatus and the valve gear whereby the motion of the former is communicated to the valve gear and the valves thereby driven and released; substantially as set forth.

8. In a direct acting steam engine in which the steam is used expansively, the compensating apparatus at each side of the engine and connected with the main piston rods, combined with mechanism substantially as described intermediate said apparatus and the valve gear whereby each side of the engine is caused to effect its own release or cut off and to drive the induction and exhaust valves of the other side of the engine; substantially as set forth.

9. In a direct acting steam engine, the cylinders with their induction and exhaust valves, and the valve gear connected with the same, combined with the parallel rock shafts to whose ends the drive rods of said valve gear are connected, the slotted arms on said rock shafts, the slides therein connected with the release rods of said valve gear, the rocking levers connected at one end to said slides, the pistons and rods connected to the other end of said rocking levers, and the regulator cylinders receiving said pistons and connected with a source of pressure; substantially as set forth.

10. In a direct acting steam engine, the cylinders with their induction and exhaust valves, and the valve gear connected with the same, combined with the parallel rock shafts to whose ends the drive rods of said valve gear are connected, the slotted arms on said rock shafts, the adjustable slides therein, and the release rods of said valve gear connected with said slides; substantially as set forth.

Signed at New York, in the county of New York and State of New York, this 15th day of February, A. D. 1892.

JOHN A. GROSHON.

Witnesses:
CHAS. C. GILL,
R. A. PORTEOUS.